(12) United States Patent
Perini

(10) Patent No.: US 6,351,199 B1
(45) Date of Patent: Feb. 26, 2002

(54) POSITION SENSOR FOR LATCHING SOLENOID VALVE

(75) Inventor: Richard J. Perini, Holland, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 09/573,933

(22) Filed: May 18, 2000

(51) Int. Cl.$^7$ .............................................. H01H 9/00
(52) U.S. Cl. ........................................ 335/177; 335/17
(58) Field of Search ................................ 335/177–179, 335/17, 167–176; 251/129.1–129.22

(56) References Cited

U.S. PATENT DOCUMENTS

| | | | |
|---|---|---|---|
| 3,961,298 A | | 6/1976 | Jaffe et al. |
| 4,994,776 A | * | 2/1991 | Juncu ........................... 335/81 |
| 5,394,131 A | | 2/1995 | Lungu |
| 5,667,504 A | | 9/1997 | Baumann et al. |
| 5,769,043 A | * | 6/1998 | Nitkiewicz ............... 123/90.11 |

FOREIGN PATENT DOCUMENTS

JP  3-150809  * 6/1991

* cited by examiner

Primary Examiner—Lincoln Donovan
(74) Attorney, Agent, or Firm—Phillips, Lytle, Hitchcock, Blaine & Huber LLP

(57) ABSTRACT

The invention is directed to an improved position sensor for a latching solenoid (15). In the preferred embodiment, the solenoid has a permanent magnet (16), a coil (18) adapted to be selectively energized by either a positive or negative current, a first pole-piece (19) and a second pole-piece (20), a first armature (21) positioned between the pole pieces, a first air-gap (22) and a second air-gap (23) between the armature and the first and second pole pieces, respectively, and a first magnetic flux path (24) and second magnetic flux path (25) associated with the first and second pole pieces, respectively, the armature being movable between an alternate first position (26) and second position (28) wherein flux from the magnet will hold the armature in either of the positions, the armature, magnet and air-gaps being so configured and arranged that selective energization of the coil produces a coil flux to cause the armature to move to and latch in one of the positions. The improvement comprises an indicator pole piece (29), an indicator armature (30) being movable between a first indicator position (31) and a second indicator position (32), an indicator air-gap (33) between the indicator pole piece and the indicator armature, the indicator pole piece, armature, and air-gap being arranged in only one of the flux paths such that the magnet flux in the flux path influences the indicator armature, whereby the position of the indicator armature provides an indication of the position of the first armature.

7 Claims, 3 Drawing Sheets

POSITION SENSOR FOR LATCHING SOLENOID VALVE

TECHNICAL FIELD

The present invention relates generally to the field of solenoid valves and, more particularly, to an improved position sensor for a latching solenoid valve.

BACKGROUND ART

A variety of mechanisms have been used in the past to sense the position of a solenoid valve. Solenoid operated two-position latching valves are held in either open or closed positions by permanent magnetic flux and only require momentary energization of the solenoid coil to change the latched state. In many applications of such valves, it is desirable to have a continuous indication of the position of the valve.

Such position sensors have usually taken the form of a position indicator or switch which is coupled to the moving element of the valve, often through a seal or bellows. Alternately, and less commonly, a flux measuring sensor may be used to detect the flux mode operating on the valve, and thus the position of the valve. One such arrangement is shown in U.S. Pat. No. 5,394,131 (*Langu*). FIG. 7 of *Langu* discloses a magnetic drive with a primary armature and a secondary armature mounted on opposite sides of a solenoid coil. Both armatures are permanent magnets and the flux circuit is arranged such that there are two alternate flux paths, depending on the position of the primary armature. Motion of the secondary magnetized armature may be implemented by the mechanical displacement of the primary armature and resulting change in flux pattern from one path to the other. However, *Langu* is limited in that it teaches a symmetric circuit in which the indicating armature is sensitive to flux in both flux paths.

Hence, it would be beneficial to have a more versatile configuration in which the indicating armature need only be located in one flux path.

DISCLOSURE OF THE INVENTION

With parenthetical reference to the corresponding parts, portions or surfaces of the disclosed embodiment, merely for the purposes of illustration and not by way of limitation, the present invention provides an improved solenoid (15) having a permanent magnet (16), a coil (18) adapted to be selectively energized by either a positive or negative current, a first pole-piece (19) and a second pole-piece (20), a first armature (21) positioned between the pole pieces, a first air-gap (22) and a second air-gap (23) between the armature and the first and second pole pieces, respectively, and a first magnetic flux path (24) and second magnetic flux path (25) associated with the first and second pole pieces, respectively, the armature being movable between an alternate first position (26) and second position (28) wherein flux from the magnet will hold the armature in either of the positions, the armature, magnet and air-gaps being so configured and arranged that selective energization of the coil produces a coil flux to cause the armature to move to and latch in one of the positions.

The improvement comprises the improved solenoid having an indicator pole piece (29), an indicator armature (30) being movable between a first indicator position (31) and a second indicator position (32), an indicator air-gap (33) between the indicator pole piece and the indicator armature, the indicator pole piece, armature, and air-gap being arranged in only one of the flux paths such that the magnet flux in the flux path influences the indicator armature, whereby the position of the indicator armature provides an indication of the position of the first armature.

The coil may be arranged to produce a coil flux in only one of the flux paths. The improved solenoid may also comprise at least one spring (35) arranged to bias the indicator armature toward the first indicator position. The first and second flux paths may conduct flux from only one permanent magnet.

The present invention also includes a solenoid wherein one of the air-gaps, and the corresponding pole piece and flux path are eliminated and instead are replaced with a spring and stop arranged to bias the first armature toward one of the armature positions.

Accordingly, the general object of the present invention is to provide an improved position sensor for a latching solenoid valve which properly indicates the position of the primary valve armature to show when the valve is in an open position and when it is in a closed position.

Another object is to provide an improved position sensor for a latching solenoid valve which indicates the position of the valve armature based on the orientation of the flux.

Another object is to provide an improved position sensor which allows for more versatile design and incorporation into the valve body.

Another object is to provide an improved position sensor in which the indicating armature is located in only one flux path.

Another object is to provide an improved position sensor which allows for the use of a variety of different valve armature compositions and configurations.

Another object is to provide an improved position sensor for a latching solenoid valve which allows for flexibility in latching strength.

Another object is to provide an improved position sensor which needs only a single magnet in the latching solenoid valve and position sensor.

Another object is to provide an improved position sensor for a latching solenoid valve which indicates the position of the valve through a microswitch.

These and other objects and advances will become apparent from the foregoing and ongoing written specification, the drawings, and the appended claims.

DESCRIPTION OF THE PREFERRED EMBODIMENTS

Figure 1:
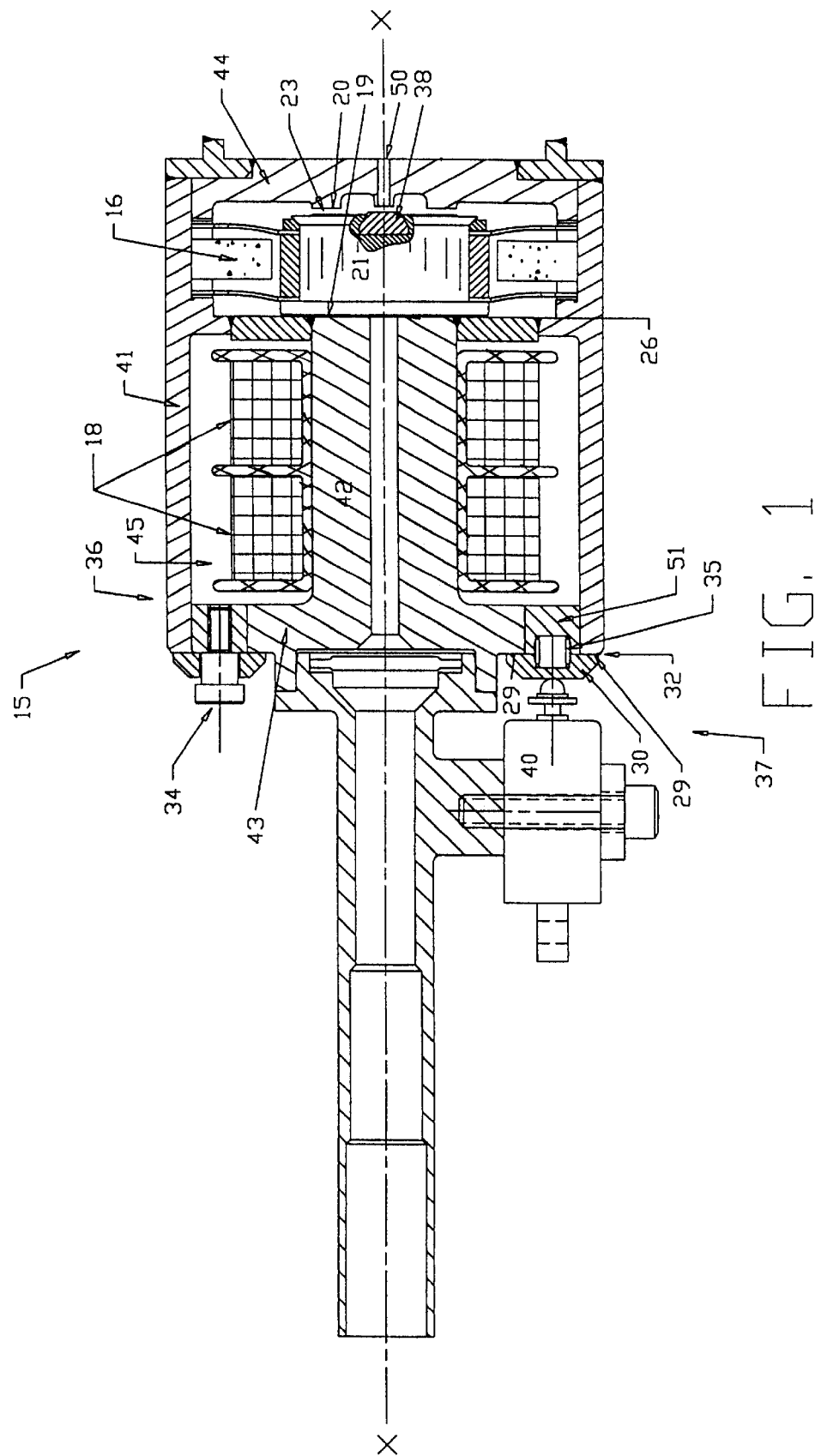
FIG. 1 is a longitudinal vertical sectional view of the improved solenoid.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Referring now to the drawings and, more particularly, to FIG. 1 thereof, this invention provides an improved solenoid valve, of which the presently preferred embodiment is generally indicated at 15. Solenoid valve 15 is generally a cylindrical structure elongated along axis x—x. As shown in FIG. 1, solenoid 15 is shown as broadly including a flux conducting housing 36, a radially magnetized ring magnet 16, annular coils 18, a movable annular first armature 21, and position sensor 37.

Figure 2:
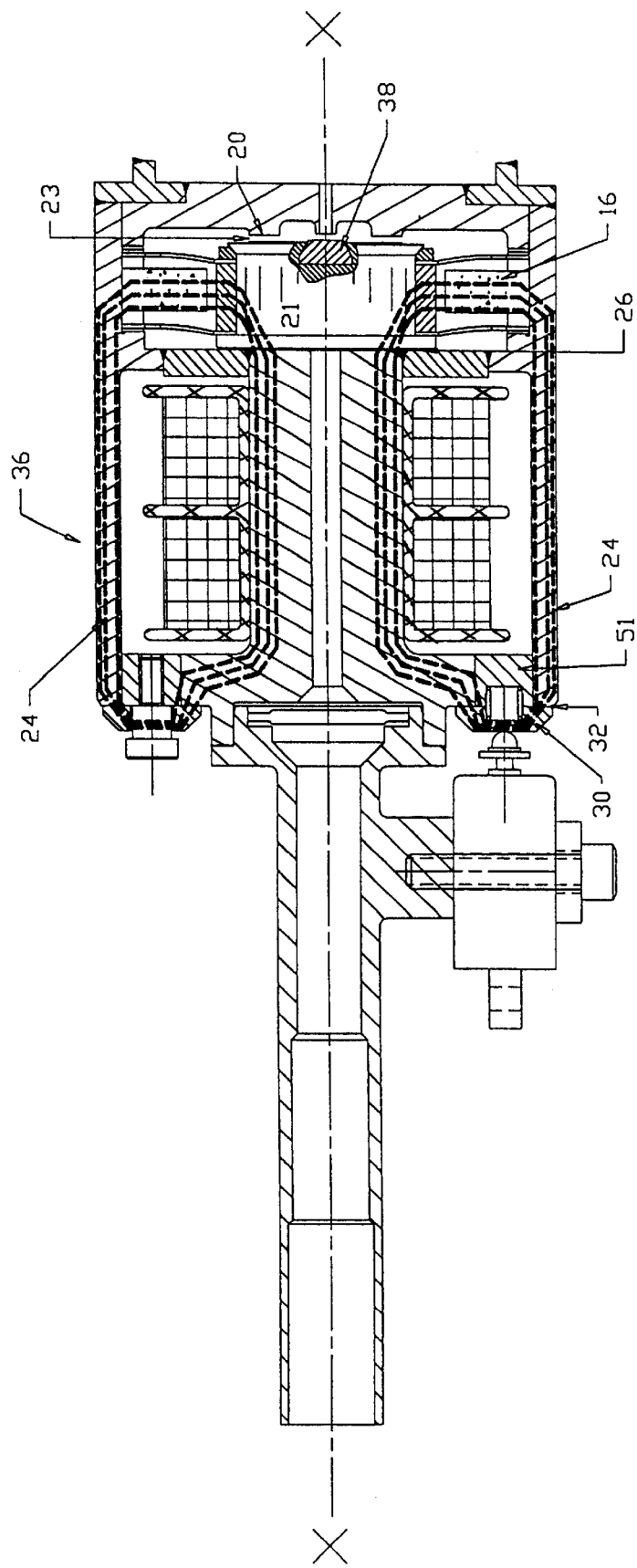
FIG. 2 shows the flux path when the valve shown in FIG. 1 is in an open position.
Figure 3:
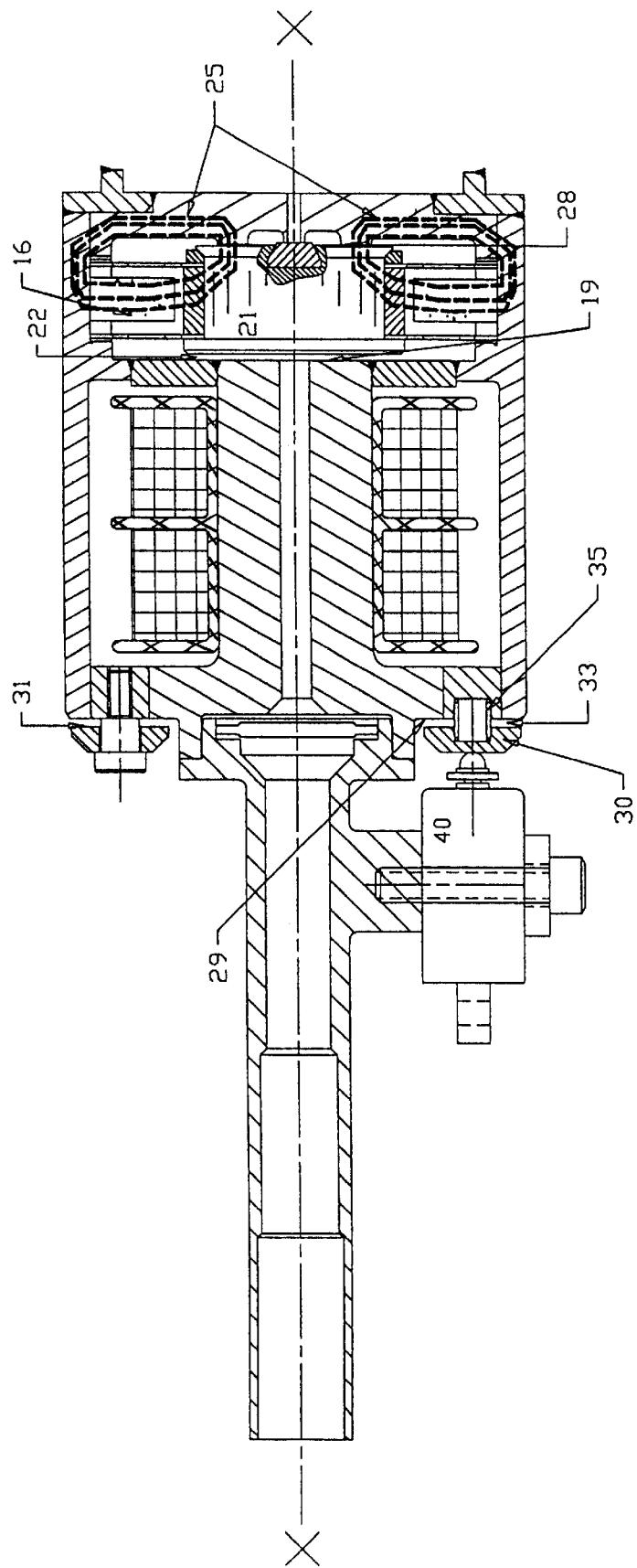
FIG. 3 shows the flux path when the valve shown in FIG. 1 is in a closed position.

Armature 21 and ring magnet 16 are concentric members elongated along axis x—x. The outer diameter of armature 21 is less than the inner diameter of annular magnet 16. Armature 21 is capable of axial movement between a first transverse position 26 and a second transverse position 28. FIGS. 1–2 show armature 21 in first position 26. As shown in FIG. 1, the leftwardly-facing vertical surface of armature 21 is in contact with the rightwardly-facing annular vertical surface of first pole piece 19. FIG. 3 shows armature 21 in second position 28. As shown in FIG. 3, the rightwardly-facing vertical surface of armature 21 is in contact with the leftwardly-facing annular vertical surface of pole piece 20 of housing 36.

Armature 21 latches against either annular pole piece 19 or annular pole piece 20 due to the permanent magnetic flux pattern created by magnet 16 and the flux characteristics of housing 36. Armature 21 contains a valve seat 38. Valve seat 38 is arranged such that when armature 21 latches against second pole piece 20, valve seat 38 closes fluid port 50. Alternatively, when armature 21 latches against first pole piece 19 of core 42, valve seat 38 is in an open position and fluid port 50 is not blocked.

FIGS. 1–2 show armature 21 latched in first position 26 such that valve seat 38 is in an open position. In this open position, second air gap 23 is present between armature 21 and second pole piece 20. Second air gap 23 is the space between the rightwardly-facing vertical surface of armature 21 and the leftwardly-facing annular vertical surface of second pole piece 20. To assume a closed position, armature 21 is moved to the right such that second air gap 23 is closed and the rightwardly-facing vertical surface of armature 21 abuts the leftwardly-facing annular vertical surface of second pole piece 20. In this closed position, first air gap 22 is open. First air gap 22 is the space between the leftwardly-facing vertical surface of armature 21 and the rightwardly-facing annular vertical surface of first pole piece 19.

As shown in FIG. 1, solenoid 15 includes housing 36. Housing 36 is comprised of an outer housing cylinder 41, an cylindrical inner core 42, left annular flange 43, and right annular disc 44, each elongated along axis x—x. The inner solenoid coils 18 are wound around the outer horizontal cylindrical surface of inner core 42 and are positioned in the space formed between the inner horizontal cylindrical surface of outer housing cylinder 41 and the outer horizontal cylindrical surface of inner core 42. Coil 18 is adapted to be selectively energized either by a positive or negative electric current. When coil 18 is energized with the appropriate current, it creates a coil flux which causes armature 21 to move between first position 26 and second position 28.

As shown in FIG. 1, position sensor 37 includes annular indicator pole pieces 29, an annular indicator armature 30 carried on three circumferentially spaced guide pins 34, an annular indicator air gap 33, three springs 35 spaced between guide pins 34, an annular non-flux-conducting ring 51 and a standard microswitch 40. As shown, springs 35 are arranged to bias indicator armature 30 to the left and away from indicator pole piece 29. Absent a counterbalancing force, springs 35 will operate on indicator armature 30 such that the rightwardly-facing annular vertical surface of indicator armature 30 is distanced from the leftwardly-facing annular vertical surface of indicator pole pieces 29 by indicator air gap 33. Indicator armature 30 is configured to, under certain flux conditions, move to the right so as to close indicator air gap 33 and contact indicator pole pieces 29.

Annular non-flux-conducting ring 51 separates outer housing cylinder 41 from left annular flange 43 and causes magnetic flux to be channeled across indicator air gap 33 and through indicator armature 30.

Microswitch 40 is a conventional switch which senses, and is adapted to indicate, the movement of indicator armature 30 between a first position 31, in which the rightwardly-facing annular vertical surface of armature 30 is separated from the leftwardly-facing annular vertical surfaces of pole pieces 29 (as shown in FIG. 3), and a second position 32, in which the rightwardly-facing annular vertical surface of armature 30 contacts the leftwardly-facing annular vertical surfaces of pole pieces 29 (as shown in FIG. 2).

First armature 21 cooperates magnetically with first annular pole piece 19 and second annular pole piece 20. Similarly, indicator armature 30 cooperates magnetically with indicator pole pieces 29. As shown in FIG. 2, magnet 16, armature 21, indicator armature 30, and housing 36 are configured such that first flux path 24 is the predominate flux path when armature 21 is in a first position 26 and valve seat 38 is open. As shown, the magnetic flux through housing 36 flows in a transverse cylindrical loop: from permanent ring magnet 16, through the structure of outer housing cylinder 41, creates a magnetic force across indicator air gap 33 such that indicator armature 30 is drawn to the right and against indicator pole piece 29, through indicator pole piece 29, through left flange 43, back through inner core 42, through armature 21, and completing the path at magnet 16. As shown, in this first flux path 24, armature 21 is held in first position 26 and valve seat 38 is latched in an open position.

FIG. 3 shows second flux path 25, which is the predominant flux path when valve seat 38 is in a closed position. As shown, second flux path 25 flows in a transverse cylindrical loop: from magnet 16, through the right distal end of outer housing cylinder 41, through the structure of right disc 44, through armature 21, to complete the path at magnet 16. As shown, in this second flux path 25, armature 21 is held in second position 28 and valve seat 38 is latched in a closed position.

As shown in FIG. 3, as a result of the flux being predominantly in second flux path 25, rather than the first flux path 24, indicator armature 30 is not drawn to indicator pole pieces 29 with sufficient force to counter the opposite bias of springs 35. Thus, when the magnetic flux moves from first flux path 24 to second flux path 25, springs 35 force indicator armature 30 to the left, thereby triggering microswitch 40. When triggered, microswitch 40 indicates that the armature has moved to an alternate position and valve seat 38 is closed.

In order to move armature 21 and to alternate the flux circuit between first flux path 24 and second flux path 25, coils 18 are momentarily energized with the appropriate positive or negative current to override the then existing latching flux, causing armature 21 to move to the opposite pole.

In an alternate embodiment, an armature spring is fitted into a bore on the right end of first pole piece 19. The armature spring is arranged to bias armature 21 to the right against a stop which replaces pole piece 20. Absent a counterbalancing force, the armature spring will operate on armature 21 such that the rightwardly-facing annular vertical surface of armature 21 contacts the stop. However, coil 18 may be energized to create a force sufficient to overcome the bias of the armature spring and thereby move armature 21 from second position 28 to first position 26. The bias force of the armature spring is less than the latching force operating on armature 21 in first flux path 24 such that armature 21 is latched in open first position 26 until appropriate energization of coil 18.

The present invention contemplates that many changes and modifications may be made. Therefore, while a presently-preferred form of the improved apparatus has been shown and described, and several modifications thereof discussed, persons skilled in this art will readily appreciate that various additional changes and modifications may be made without departing from the spirit of the invention, as defined and differentiated by the following claims.

What is claimed is:

1. In a solenoid having a permanent magnet, a coil adapted to be selectively energized by either a positive or negative current, first and second pole-pieces, a first armature positioned between said pole-pieces, first and second air-gaps between said armature and said first and second pole-pieces, respectively, and first and second magnetic flux-paths associated with said first and second pole-pieces, respectively; said armature being movable between alternate first and second positions wherein flux from said magnet will hold said armature in either of said positions, said armature, magnet and air-gaps being so configured and arranged that selective energization of said coil produces a coil flux to cause said armature to move to and latch in one of said positions, the improvement comprising:

an indicator pole piece;

an indicator armature being movable between first and second indicator positions, an indicator air-gap between said indicator pole piece and said indicator armature;

said indicator pole piece, armature and air-gap being arranged in only one of said flux paths such that said magnet flux in said one flux path influences said indicator armature, whereby the position of said indicator armature provides an indication of the position of said first armature.

2. The improvement set forth in claim 1, wherein said coil is arranged to produce said coil flux in only one of said flux paths.

3. The improvement set forth in claim 2, wherein said indicator pole piece, armature and air-gap are arranged in the same flux path as said coil.

4. The improvement set forth in claim 1, and further comprising a spring arranged to bias said indicator armature toward said first indicator position.

5. The improvement set forth in claim 1, wherein said first and second flux paths conduct flux from only one permanent magnet.

6. In a solenoid having a permanent magnet, a coil adapted to be selectively energized by either a positive or negative current, a pole-piece, a first armature, an air-gap between said armature and said pole-piece, a magnetic flux-path associated with said pole-piece; said armature being movable between alternate first and second positions wherein flux from said magnet will hold said armature in one of said positions, said armature, magnet and air-gap being so configured and arranged that selective energization of said coil produces a coil flux to cause said armature to move to and latch in one of said positions, the improvement comprising:

an indicator pole piece;

an indicator armature being movable between first and second positions, an indicator air-gap between said indicator pole piece and said indicator armature;

said armature and indicator air-gap being arranged in said flux path such that said magnet flux in said flux path influences said indicator armature, whereby the position of said indicator armature provides an indication of the position of said first armature.

7. The improvement set forth in claim 6, and further comprising a spring arranged to bias said first armature toward one of said positions.

* * * * *